2 Sheets—Sheet 1.

G. H. WILCOX.
Mirror Attachment.

No. 207,579. Patented Aug. 27, 1878.

Witnesses:
Morton Toulmin
W. R. Irwin

Inventor:
Gordon H. Wilcox

2 Sheets—Sheet 2.

G. H. WILCOX.
Mirror Attachment.

No. 207,579. Patented Aug. 27, 1878.

Witnesses:
Morton Toulmin
W. R. Irwin

Inventor:
Gurdon H. Wilcox

UNITED STATES PATENT OFFICE.

GURDON H. WILCOX, OF WASHINGTON, DISTRICT OF COLUMBIA.

IMPROVEMENT IN MIRROR ATTACHMENTS.

Specification forming part of Letters Patent No. 207,579, dated August 27, 1878; application filed August 17, 1878.

*To all whom it may concern:*

Be it known that I, GURDON H. WILCOX, of Washington, District of Columbia, have invented certain new and useful Improvements in Attachments for Mirrors and a Combination for Double Reflection, reference being had to the accompanying drawings, and to the letters of reference marked thereon, making a part of this specification.

The object of my invention is to so arrange two mirrors that a person using the same may obtain front, back, and side views at the same time.

The invention consists in the attachments to the backs and frames of the mirrors and the particular construction and arrangement of the mechanism.

Figure 1:
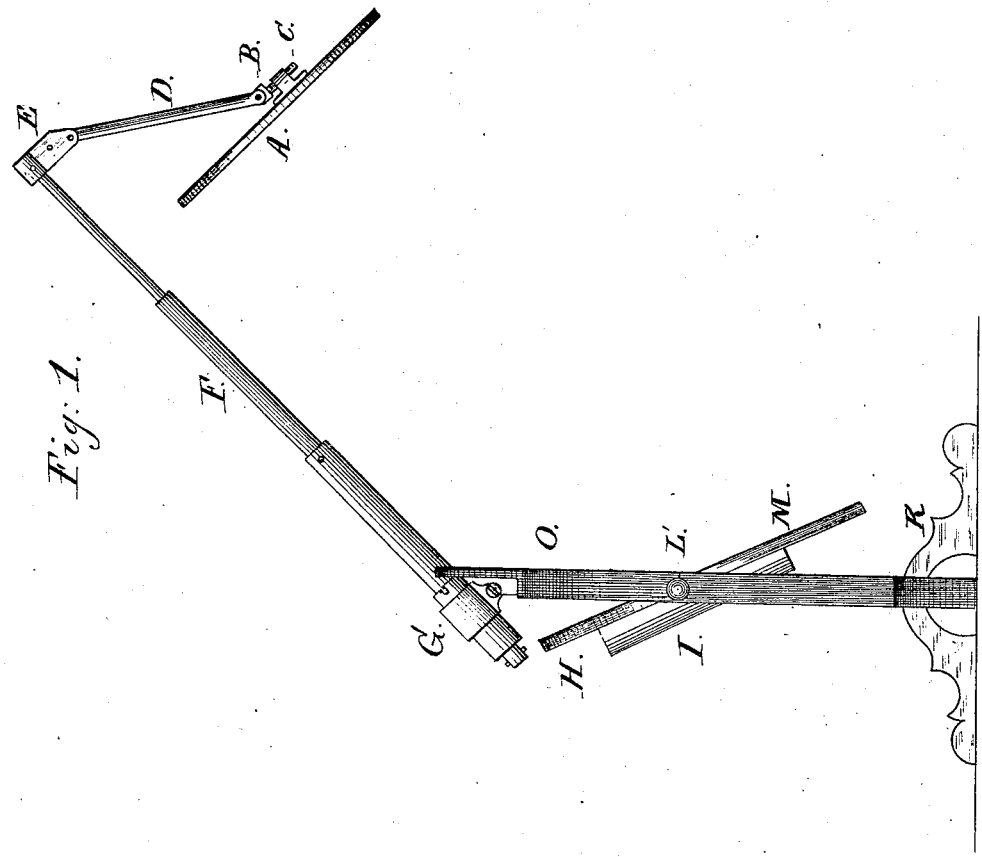
Figure 2:
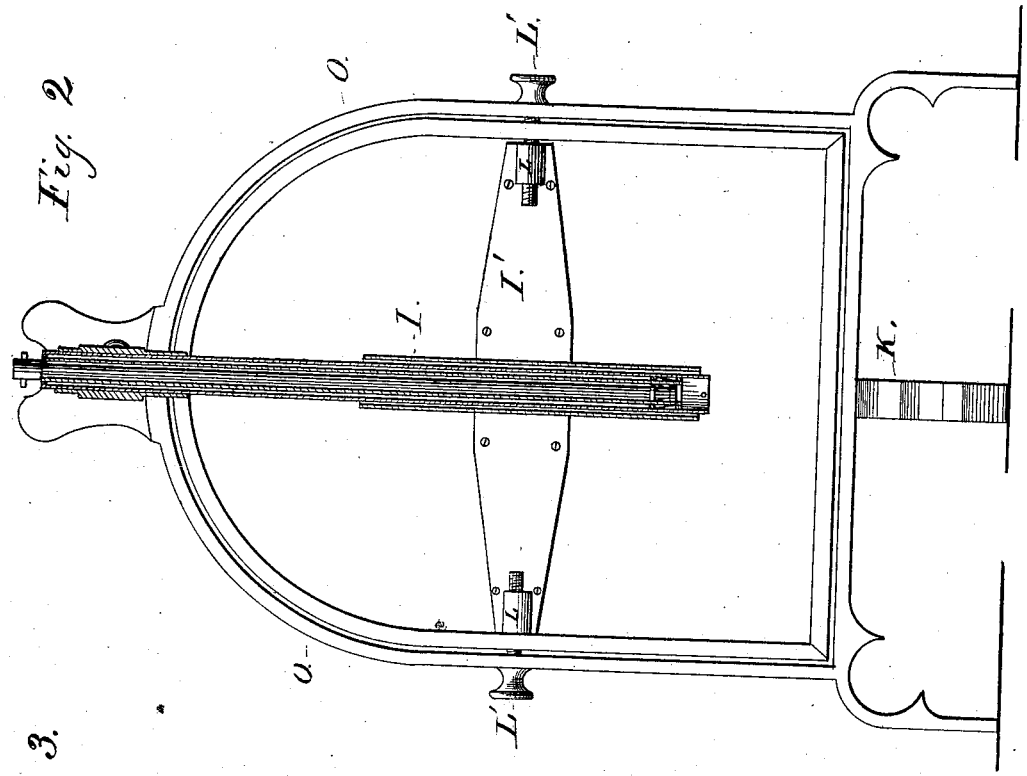
Figure 3:
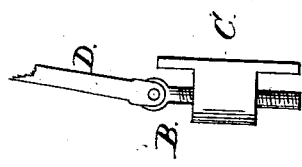
Figure 4:
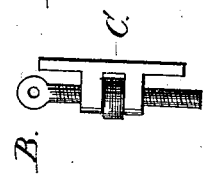

In the accompanying drawings, in which similar letters of reference indicate like parts, Figure 1, Sheet 1, is a side elevation of the toilet-mirror. Fig. 2, Sheet 2, is a back view of the mirror M, showing the telescopic tubing in section. Fig. 3, Sheet 2, is a detail view of screw B and nut C. Fig. 4, Sheet 2, is a view in detail of a modification of the screw B and nut C.

Near the center of the back of the circular mirror A is attached an elongated nut, C, to which is fitted a screw, B, which is fastened by a movable joint to a rod, D, which is also fastened by a movable joint to a short arm, E, attached firmly to a telescopic tubing, F, which works in a movable socket, G, attached to the frame O of the mirror M.

The elongated nut C, instead of having threads all the way through, may be smooth inside with a space in the center admitting a circular milled nut with threads fitting the screw B, which, being turned, will move the end of the screw B to or from the center of the glass A, as illustrated in Fig. 4, Sheet 2.

When in use, the telescopic tubing F is extended and brought forward and the circular mirror A is suspended from the screw B above and in front of the mirror M.

By moving the screw B the center of gravity of the glass A is changed when so suspended, thereby causing the glass to hang at a different and any desired angle. The object is to adjust the angle of the mirror A easily, so that a person in looking in mirror M may observe the back, top, and sides of the head from reflections of mirror A in mirror M.

The back H of the mirror M, to which the glass is attached by a rim or otherwise, is constructed in one or more pieces, in such a manner that it suspends the mirror M at or near its center by means of screws L passing through the frame O and into the back H, which screws, acting as a pivot, permit of the easy movement of the mirror M, or by tightening the screws will hold the mirror M at any desired angle. The back H also contains a receptacle, I, for the telescopic tubing F when closed, thereby preventing the mirror M from turning.

The socket G is so attached to the frame O, and the frame is so constructed that it will permit the tubing F to be extended above and in front of the mirror M at a convenient angle for suspending mirror A, for the object desired, and with the arm E and rod D, when the telescopic tubing F is closed, will bring the mirror A face to face with mirror M, and by turning the movable legs K of the frame O parallel with the frame O the whole, including mirrors, frames, and attachments, will be closed together in a compact form for transportation or laying away.

I claim—

1. In a toilet-mirror, the adjustable screw B and nut C, when attached to the back of the circular mirror A, substantially as described, and for the purposes set forth.

2. In combination with a mirror pivoted in a vertical frame and having a vertical socket upon its back, an extensible tube having a supplemental mirror connected to its outer end by a swinging arm and pivoted at its inner end to the mirror frame, so as to render the tubing and supplemental mirror capable of being compactly folded on opposite sides of the main mirror, substantially as shown and described.

3. The combination of a telescopic rod, F, hinge-socket G, plate or arm E, and pivoted rod D with screw B and nut C, when attached to the back of circular mirror A, as shown and described, and for the purposes set forth.

GURDON H. WILCOX.

Witnesses:
MORTON TOULMIN,
W. R. IRWIN.